(12) United States Patent
Jiang et al.

(10) Patent No.: US 8,973,266 B2
(45) Date of Patent: Mar. 10, 2015

(54) AIR TURBINE STARTER MATCHED SET GEAR CAGE ALIGNMENT FEATURE

(71) Applicants: Yiwei Jiang, Rockford, IL (US); Jeffrey M. Makulec, Rockford, IL (US); Bradley Thomas Ryan, Machesney Park, IL (US)

(72) Inventors: Yiwei Jiang, Rockford, IL (US); Jeffrey M. Makulec, Rockford, IL (US); Bradley Thomas Ryan, Machesney Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 200 days.

(21) Appl. No.: 13/673,174

(22) Filed: Nov. 9, 2012

(65) Prior Publication Data
US 2014/0130356 A1    May 15, 2014

(51) Int. Cl.
*F02C 7/275* (2006.01)
*F16H 57/02* (2012.01)
*F16H 57/021* (2012.01)
*F16H 57/023* (2012.01)

(52) U.S. Cl.
CPC ............. *F16H 57/02* (2013.01); *F16H 57/021* (2013.01); *F16H 57/023* (2013.01)

USPC ............ 29/893.1; 29/889.2; 60/788; 475/331

(58) Field of Classification Search
CPC ........ F16H 57/02; F16H 57/21; F16H 57/023
USPC ................ 29/893.1, 889.2, 700; 60/788, 789; 415/182.1, 206, 229; 416/223 A
See application file for complete search history.

(56) References Cited

U.S. PATENT DOCUMENTS 8,485,936 B2 *    7/2013    Makulec et al. ............. 475/331

\* cited by examiner

*Primary Examiner* — Alexander P Taousakis
(74) *Attorney, Agent, or Firm* — Cantor Colburn LLP (57) ABSTRACT

A gear cage assembly configured to support a plurality of planet gear in an air turbine starter is provided including a main plate and a back plate. The main plate includes a plurality of legs that extend from a first surface. A pin protrudes from a one of the plurality of legs. A plurality of shallow openings formed in the first surface extends over only a portion of a depth of the main plate. The back plate includes a plurality of bearing holes substantially identical to the plurality of shallow openings. A biasing mechanism and at least one alignment feature protrude from the back plate. The at least one alignment feature and the biasing mechanism are configured to contact at least one of the plurality of legs. A bushing mounted within the back plate is configured to receive the pin.

11 Claims, 8 Drawing Sheets

AIR TURBINE STARTER MATCHED SET GEAR CAGE ALIGNMENT FEATURE

BACKGROUND OF THE INVENTION

Exemplary embodiments of this invention generally relate to an air turbine starter and, more particularly, to a retention feature for retaining a planetary gear system in an air turbine starter.

Gas turbine engines, such as those used in aircrafts for example, require significant torque be applied to rotate a compressor, and thereby provide sufficient compression to start the engine. Electric motors powerful enough to provide such torque can be used, but are relatively heavy. In applications where gas turbine engines are used for transportation purposes, for example aircraft propulsion and power, the extra weight of an electric motor is undesirable. An air turbine starter (ATS) is generally employed as a substitute in such applications. The ATS is powered by compressed air from an external source. The compressed air passes over blades of an air turbine in the ATS and exits the ATS through an air exit port. As the air turbine rotates, it rotates a series of shafts connected to the compressor in the gas turbine engine, thereby providing sufficient torque to start the engine.

Conventional ATS systems include a planetary gear system. A sun gear rotates about a central axis, and a ring gear rotates outwardly of the sun gear. Multiple planet gears are positioned to transmit rotation between the sun and ring gears. In a known type of planetary gear system, the planet gears are mounted on stationary shafts such that each shaft provides an inner race for bearings which support the planet gears. In such applications, a significant force is continuously transmitted to the same angular portion of each planet shaft.

BRIEF DESCRIPTION OF THE INVENTION

According to one embodiment of the invention, a gear cage assembly configured to support a plurality of planet gear in an air turbine starter is provided including a main plate and a back plate. The main plate includes a plurality of legs that extend from a first surface. A pin protrudes from a one of the plurality of legs. A plurality of shallow openings formed in the first surface extend over only a portion of a depth of the main plate. The back plate includes a plurality of bearing holes substantially identical to the plurality of shallow openings. A biasing mechanism and at least one alignment feature protrude from the back plate. The at least one alignment feature and the biasing mechanism are configured to contact at least one of the plurality of legs. A bushing mounted within the back plate is configured to receive the pin.

According to an alternate embodiment of the invention, a method for installing at least one planet gear assembly in a gear cage assembly including a main plate and a back plate is provided. The main plate and the back plate are coupled together in an aligned orientation. At least one shallow opening is formed in the main plate and at least one bearing hole is formed in the back plate. The main plate and the back plate are then disassembled. At least one planet gear assembly is installed into the main plate and the back plate. The main plate and the back plate are fastened together in an aligned orientation.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
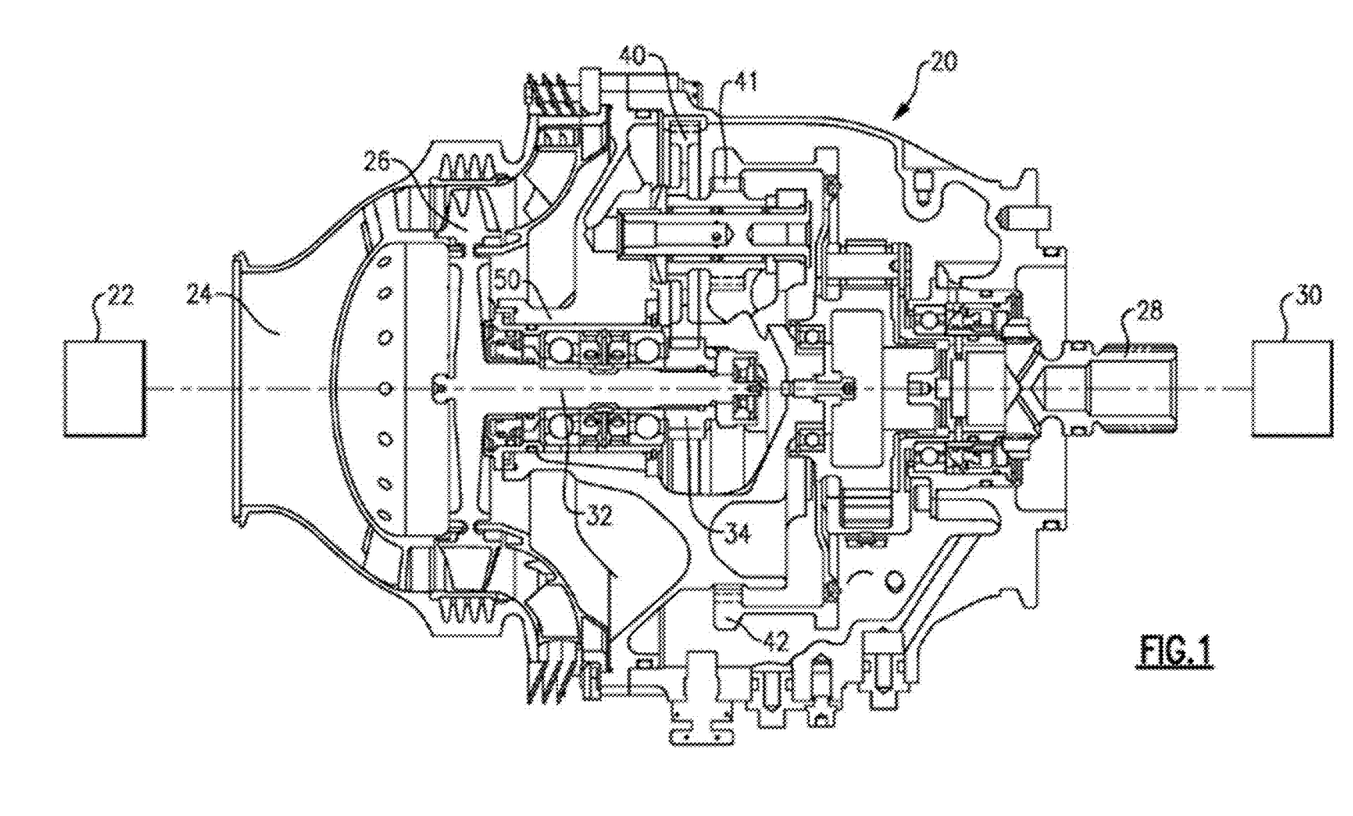
FIG. 1 is an exemplary air turbine starter of an aircraft.

Referring now to FIG. 1, an air turbine starter assembly 20 associated with a turbine engine, such as on an aircraft for example, is illustrated. A source of hot air 22, which may be an auxiliary power unit, as typically utilized while an aircraft is on the ground, delivers hot, high pressure air into an inlet 24. The high pressure air flows across a turbine rotor 26, causing the turbine rotor 26 to rotate. As the turbine rotor rotates 26, it rotates an output shaft 28 through a planetary gear system. The output shaft 28 may be utilized as a starter to start operation of a turbine engine. A planetary gear system includes a sun gear 34 that is driven by a turbine shaft 32 that rotates with the turbine rotor 26. The sun gear 34 in turn drives a plurality of planet gears 40 housed within a gear cage assembly 50. The planet gears 40 include output gear teeth 41 which drive a ring gear 42. The ring gear 42 drives the output shaft 28 through a mechanical connection.

Figure 4:
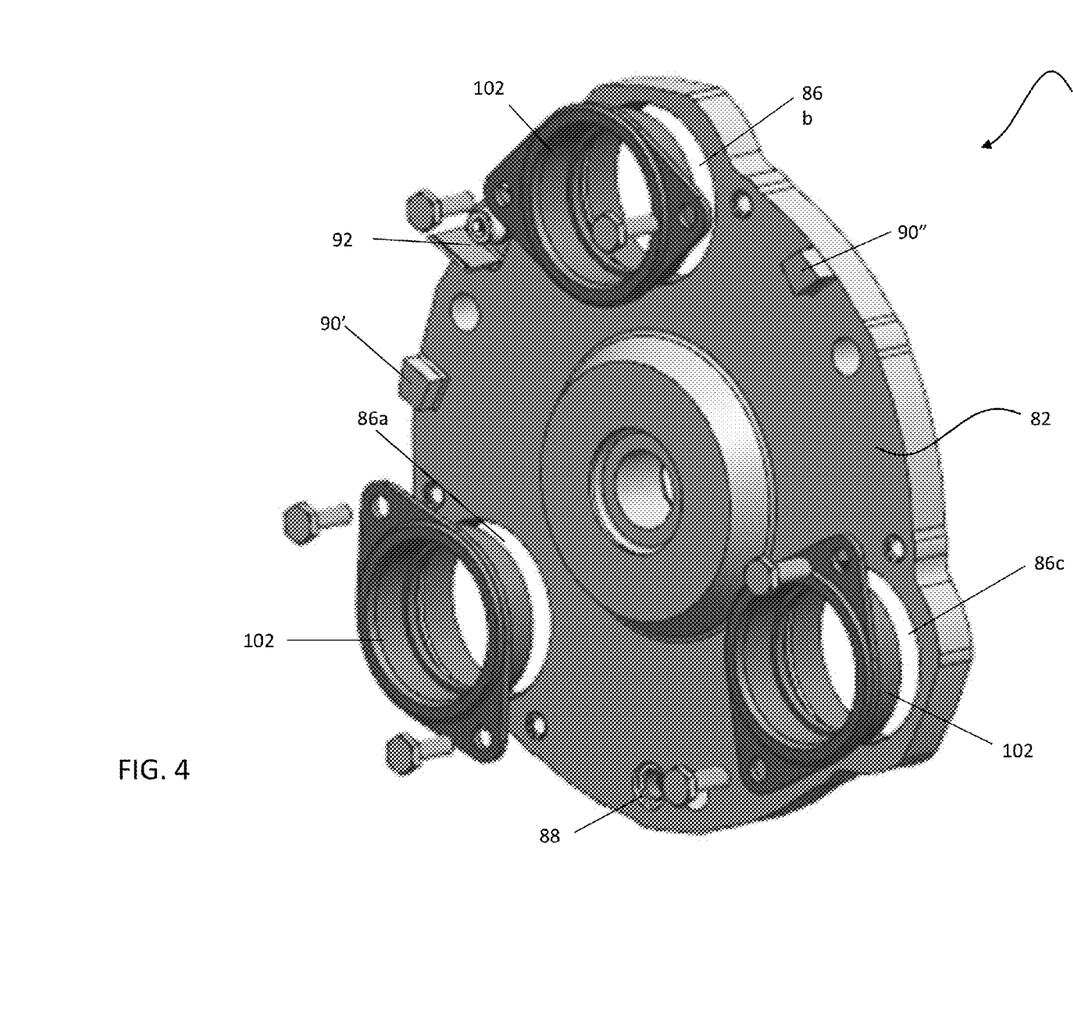
FIG. 4 is a perspective view of a back plate of a gear cage assembly according to an embodiment of the invention.
Figure 5:
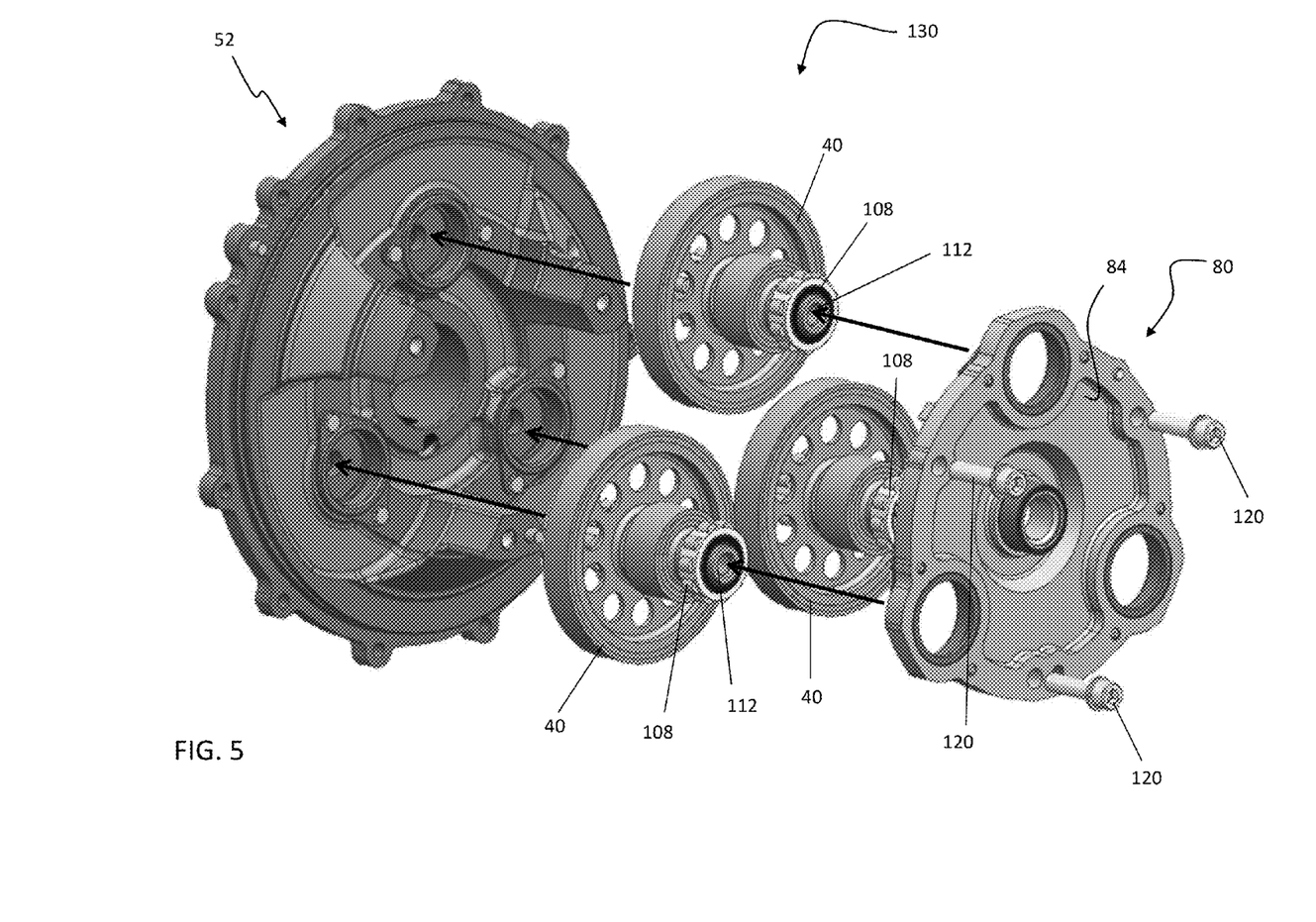
FIG. 5 is an exploded view of a gear cage assembly according to an embodiment of the invention.

The gear cage assembly 50 is illustrated in FIGS. 2-7 in more detail. The gear cage assembly 50 includes a coupled main plate 52 (FIGS. 2, 3) and back plate 80 (FIG. 4), within which a plurality of planet gears 40 are supported (FIG. 5). The main plate 52 is generally circular in shape and includes a plurality of legs 56, such as 3 legs for example, that extend generally outwardly from a first surface 54 in the direction of the back plate 80. In one embodiment, the number of legs 56 is equal to the number of planet gears 40 configured to mount to the gear cage assembly 50. Each leg 56 includes a hole 64 that extends from a free end 58 over a portion of the length of the leg 56. In one embodiment, each hole 64 includes a plurality of threads (not shown) and is configured to receive a shaft of a complementary threaded fastener 120. In one embodiment, a pin 70 protrudes outwardly of the free end 58 of one of the plurality of legs 56, such as the first leg 56a for example. The pin 70 is positioned adjacent the hole 64 and is configured to engage a complementary portion of the back plate 80. One or more of the plurality of legs 56 may include a notch 66 located adjacent one of either a first side 60 or a second side 62 of the free end 58. In one embodiment, a second leg 56b has a first notch 66' adjacent a first side 60 and a second notch 66" adjacent the second, opposite side 62 of the free end 58, and a third leg 56c includes a third notch 66''' adjacent a first side 60 of the free end 58.

Figure 2:
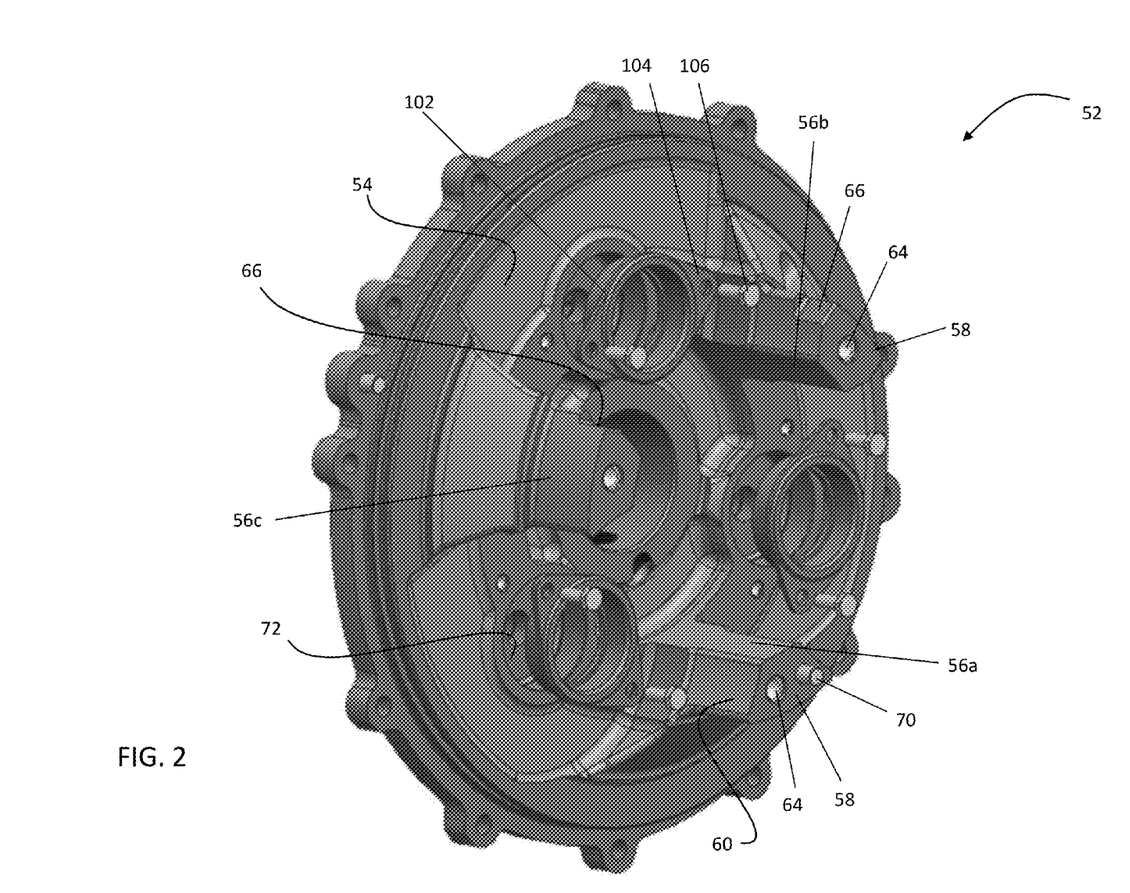
FIG. 2 is a perspective view of a main plate of a gear cage assembly according to an embodiment of the invention.
Figure 3:
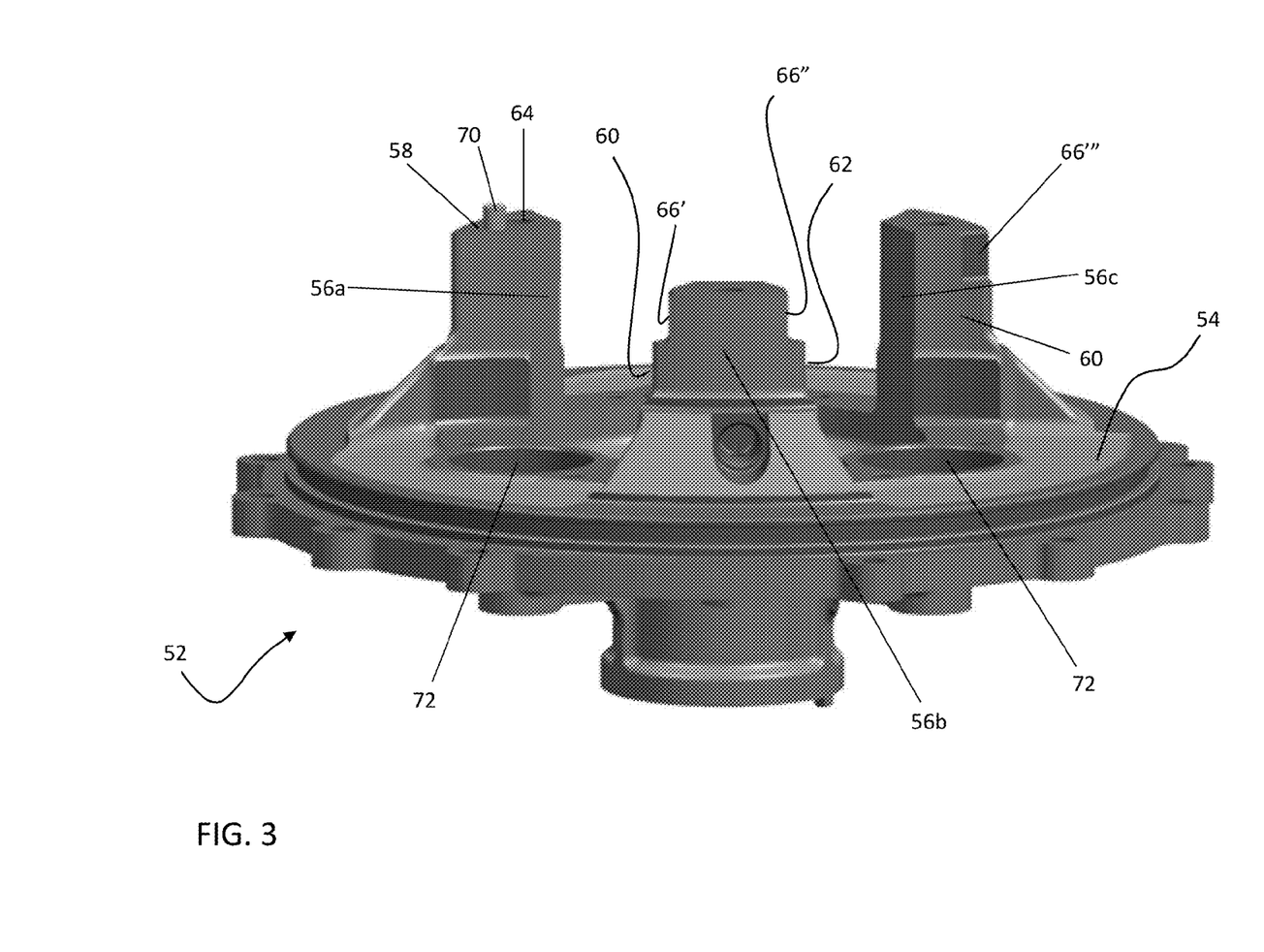
FIG. 3 is a side view of the main plate illustrated in FIG. 2.

Multiple shallow openings 72 are formed in the first surface 54 of the main plate 52. The main plate 52 includes a shallow opening 72 for each planet gear 40 that the gear cage assembly 50 is configured to support. The shallow openings 72 are arranged generally centrally between two adjacent legs 56, and each extends through only a portion of the thickness of the main plate 52 (FIG. 6).

The back plate 80 of the gear cage assembly 50 is illustrated in more detail in FIG. 4. The back plate 80 is generally circular in shape and includes a plurality of bearing holes 86 substantially identical to and configured to align with the shallow openings 72 of the main plate 52 such that the shallow openings 72 and the bearing holes 86 are arranged in pairs. In one embodiment, a bushing 88 is housed within a portion of the back plate 80 such that the bushing 88 is generally flush with a surface 82 of the back plate. The bushing 88 is configured to receive the pin 70 protruding from one of the plurality of legs 56 on the main plate 52. The back plate 80 includes at least one alignment feature 90 that protrudes from the surface 82 in the direction of the main plate 52. In one embodiment, the back plate 80 includes a first alignment feature 90' positioned between a first bearing hole 86a and a second bearing hole 86b, and a second alignment feature 90" positioned on an opposite side of the second bearing hole 86b, between the second bearing hole 86b and a third bearing hole 86c. Each alignment feature 90 is configured to engage a notch 66 on either the first side 60 or the second side 62 of one of the plurality of legs 56. A biasing means 92 mounted to the surface 82 also engages a notch 66 on one of the plurality of legs 56. In one embodiment, the biasing means 92 is a leaf spring positioned between the second bearing hole 86b and the first alignment feature 90'. The biasing means 92 biases the back plate 80 relative to the main plate 52 such that the plurality of shallow openings 72 and the plurality of bearing holes 86 are substantially aligned.

Housed within each shallow opening 72 of the main plate 52 and each bearing hole 86 of the back plate 80 is a first portion 102 of a bearing element. In one embodiment, the first bearing portion 102 is an outer race of a rolling element bearing. The first bearing portion 102 has a diameter generally equal to or slightly smaller than the diameter of the shallow opening 72 or the diameter of the bearing hole 86. In one embodiment, each first bearing portion 102 includes at least one flange 104 for connecting the first bearing portion to one of the main plate 52 and back plate 80. Fasteners 106 couple the flanges 104 of each first bearing portion 102 to either surface 54 of the main plate 52 or to surface 82 of the back plate 80 such that each first bearing portion 102 is retained within a respective shallow opening 72 or bearing hole 86.

Figure 6:
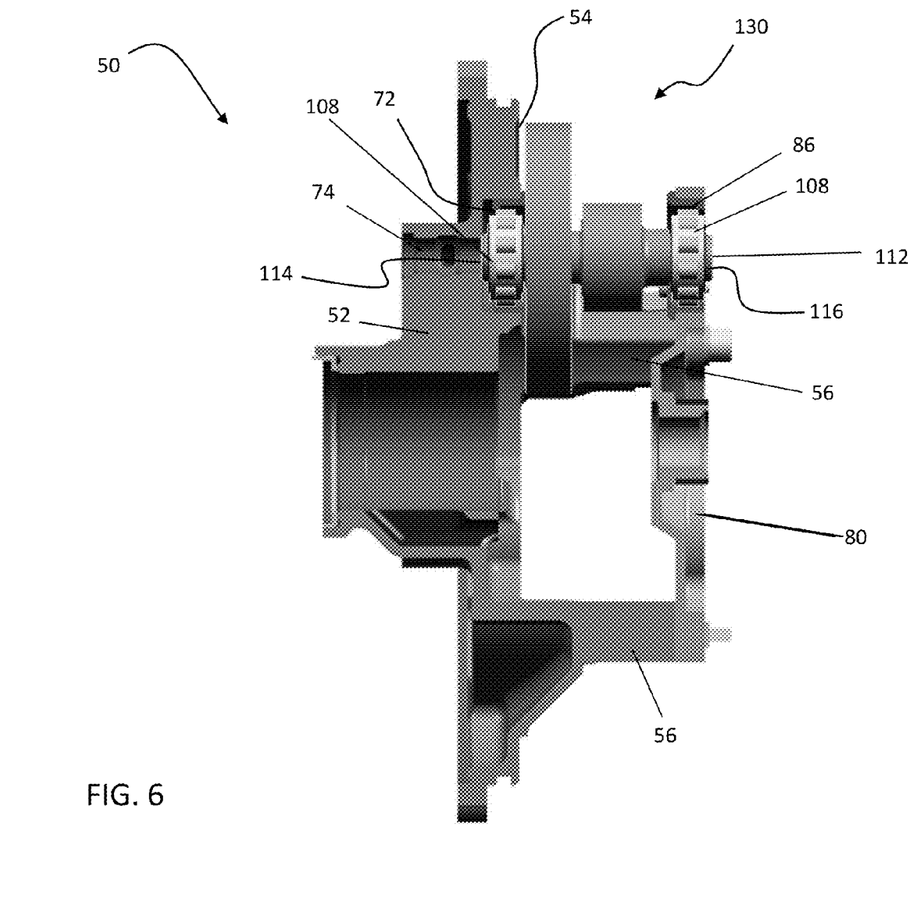
FIG. 6 is a side view of a gear cage assembly according to an embodiment of the invention.
Figure 7:
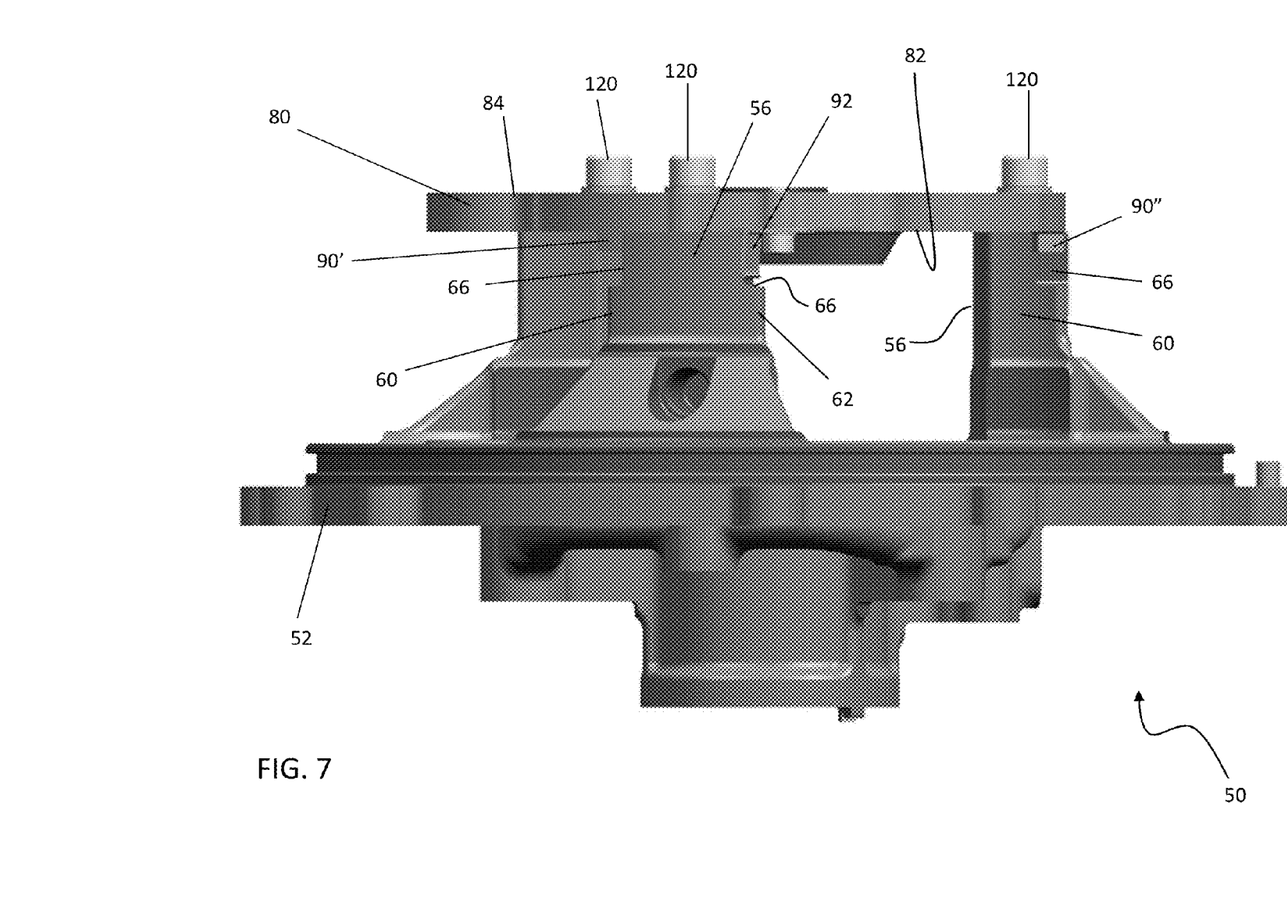
FIG. 7 is a side view of a gear cage assembly according to an embodiment of the invention.

As illustrated in FIGS. 5 and 6, each planet gear assembly 130 includes a planet gear 40 mounted on a gear shaft 112. The planet gear 40 is configured to rotate with the gear shaft 112 in response to rotation of the sun gear 34. A second portion 108 of a bearing element, complementary to the first bearing portion 102, is mounted adjacent both a first end 114 and a second, opposite end 116 of each respective gear shaft 112. In one embodiment, the second bearing portion 108 includes an inner race and a roller element. Each second bearing portion 108 mounted adjacent the first end 114 of a gear shaft 112 is received within one of the first bearing portions 102 connected to the main plate 52. Similarly, each second bearing portion 108 located near the second end 116 of a gear shaft 112 is arranged within one of the first bearing portions 102 coupled to the back plate 80. Installation of the planet gears 40 places the free ends 58 of the plurality of legs 56 in contact with the surface 82 of the back plate 80 such that the alignment features 90 and biasing means 92 engage the notches 66 of nearby legs 56. Fasteners 120 extend from an opposite surface 84 of the back plate into the holes 64 formed within each leg 56 to retain the main plate 52, back plate 80, and therefore the planet gears 40 in a desired orientation.

Figure 8:
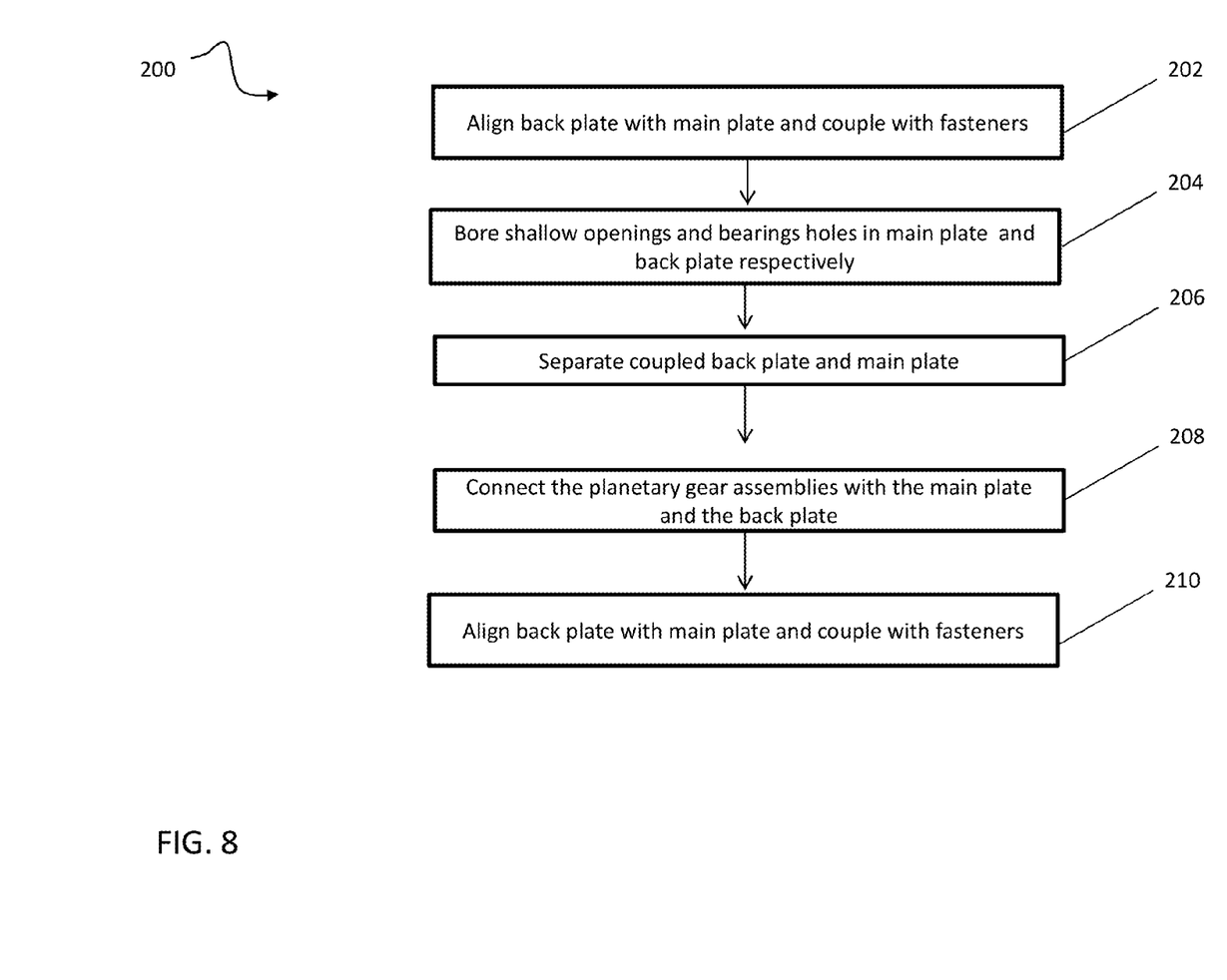
FIG. 8 is a method for installing the plurality of planetary gear assemblies within the gear cage assembly.

A method 200 of assembling the plurality of planet gears assemblies 130 into the gear cage assembly 50 is illustrated in FIG. 8. Before the planet gears assemblies 130 may be mounted within the gear cage assembly 50, the plurality of shallow openings 72 and bearing holes 84 must be formed in the main plate 52 and back plate 80 respectively. As shown in block 202, the main plate 52 and back plate 80 are aligned and connected to ensure that the first bearing portions 102 align when installed within the gear cage assembly 50. The pin 70 extending from one of the plurality of legs 56 is inserted into the bushing 88 of the back plate 80 and then the back plate 80 is rotated relative to the main plate 52. In the rotated position, the first alignment feature 90' and the biasing means 92 engage one of the plurality of legs 56 including a first notch 66' and a second notch 66", and a second alignment feature 90" is arranged generally adjacent a notch 66 on another of the plurality of legs 56. Once aligned, the fasteners 120 are installed to retain the back plate 80 and the main plate 52 in this aligned orientation. In block 204, the shallow openings 72 and bearing holes 84 are formed so that the planet gear assemblies 130 will be properly aligned when installed in the gear cage assembly 50. At least one of the shallow openings 72 and one of the bearing holes 84 are formed together in a single manufacturing operation.

After the plurality of shallow openings 72 and bearing holes 82 are formed, the back plate 80 is disassembled from the main plate 52, as shown in block 206. In block 208, the planet gear assemblies 130 are connected to both the main plate 52 and back plate 80 of the gear cage assembly 50. Each first bearing portion 102 is mounted within a shallow opening 72 of the main plate 52 or a bearing hole 84 of the back plate 80. The second bearing portions 108 mounted adjacent a first end 114 of each gear shaft 112 are then positioned within the first bearing portions 102 connected to the main plate 52. Similarly, the second bearing portions 108 mounted adjacent the second end 116 of each gear shaft 112 are arranged within the first bearing portions 102 coupled to the back plate 80. As shown in block 210, the back plate 80 and the main plate 52 are then realigned and fastened together in a desired orientation by inserting the pin 70 within the bushing 88 and then rotating the back plate 80 until at least one of the alignment features 90 and the biasing mechanism 92 engage a corresponding notch 66 on one of the plurality legs 56.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gear cage assembly configured to support a plurality of planet gears in an air turbine starter comprising:
   a main plate including:
      a plurality of legs extending outwardly from a first surface;
      a pin protruding from a free end of one of the plurality of legs; and a plurality of shallow openings formed in the first surface, extending over only a portion of a depth of the main plate; and a back plate configured to couple to the main plate, including:

a plurality of bearing holes substantially identical to the plurality of shallow openings, wherein each bearing hole is configured to form a pair with one of the shallow openings;

a biasing mechanism and at least one alignment feature protruding from a second surface of the back plate, wherein the at least one alignment feature and the biasing mechanism are configured to contact at least one of the plurality of legs; and a bushing mounted within the back plate such that the bushing is configured to receive the pin.

2. The gear cage assembly according to claim 1, further comprising a first bearing portion mounted within each of the plurality of shallow openings and the plurality of bearing holes.

3. The gear cage assembly according to claim 1, wherein the first bearing portions mounted within the plurality of shallow openings are configured to receive a second bearing portion mounted adjacent a first end of a planet gear assembly and the first bearing portions mounted within the bearing holes are configured to receive a second bearing portion mounted adjacent a second end of a planet gear assembly.

4. The gear cage assembly according to claim 3, wherein each planet gear assembly includes a gear shaft configured to rotate relative to the main plate and the back plate.

5. The gear cage assembly according to claim 1, wherein each shallow opening is positioned generally centrally between a pair of adjacent legs.

6. The gear cage assembly according to claim 1, wherein the plurality of shallow openings equal the plurality of legs.

7. The gear cage assembly according to claim 1, wherein the at least one of the plurality of legs includes a notch adjacent a side of the leg and the at least one alignment feature engages the notch.

8. The gear cage assembly according to claim 7, wherein the main plate includes a first leg having a first notch adjacent a first side and a second notch adjacent a second side, and a second leg having a third notch adjacent a first side.

9. The gear cage assembly according to claim 8, wherein a first alignment feature engages the first notch, the biasing means engages the second notch, and a second alignment feature engages the third notch.

10. The gear cage assembly according to claim 1, wherein the free end of each of the plurality of legs is configured to contact an opposing surface of the back plate.

11. The gear cage assembly according to claim 10, wherein a hole extends from the free end over a portion of a length of each leg and is configured to receive a fastener.

* * * * *